3,485,780
ROOM TEMPERATURE VULCANIZABLE SILOXANE COMPOSITIONS AND THE ELASTOMERS DERIVED THEREFROM
Samuel Sterman, Chappaqua, and James G. Marsden, Amawalk, N.Y., assignors to Union Carbide Corporation, a corporation of New York
No Drawing. Filed Mar. 18, 1968, Ser. No. 714,051
Int. Cl. C08g 47/06
U.S. Cl. 260—18    12 Claims

ABSTRACT OF THE DISCLOSURE

Room temperature vulcanizable organopolysiloxane compositions comprising a linear, fluid organopolysiloxane containing terminal silicon-bonded hydroxyl groups and as a cross-linker an epoxysilane compound; and the cross-linked elastomers derived from said compositions.

BACKGROUND OF THE INVENTION

This invention is directed to organopolysiloxane compositions convertible to the cured, cross-linked, solid elastic state at room temperature. More particularly, this invention relates to room temperature vulcanizable organopolysiloxane compositions which contain as the cross-linking agent an epoxysilane compound.

Room temperature vulcanizable siloxane compositions comprising a linear, fluid organopolysiloxane containing terminal silicon-bonded hydroxyl groups and a functional silane cross-linking agent, which are convertible to siloxane elastomers are well known in the art. However, none of the references in the prior art disclose or utilize the epoxysilanes of this invention as cross-linkers in room temperature curing systems.

SUMMARY OF THE INVENTION

Accordingly, it is an object of this invention is provide an organopolysiloxane composition convertible to a cured, cross-linked elastomer at room temperature. Another object of this invention is to provide an elastomer derived from said composition. Still another object of this invention is to provide a composition of matter comprising a primed metallic substrate having directly bonded thereto a silicone elastomer derived from room temperature vulcanization of the above-mentioned organopolysiloxane compositions of this invention. Other objects and advantages will become readily apparent from the following description and appended claims.

DESCRIPTION OF THE PREFERRED EMBODIMENTS

The particular linear fluid organopolysiloxane polymer used in the practice of the present invention is not narrowly critical and may be represented by the general formula:

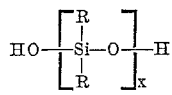

wherein $x$ is a positive integer and wherein each R is individually a monovalent hydrocarbon radical having from 1 to 18 carbon atoms, which may be substituted or unsubstituted. Among the more specific radicals that may be mentioned are, for example, alkyl radicals, such as methyl, ethyl, propyl, butyl, isobutyl, amyl, hexyl, octadecyl and the like; aryl radicals, such as phenyl, diphenyl, naphthyl and the like; aralkyl, such as benzyl, phenylethyl and the like; alkaryl radicals, such as tolyl, xylyl, ethylphenyl, mesityl and the like; alicyclic radicals, such as cyclopentyl, cyclohexyl and the like; and alkenyl radicals, such as vinyl, allyl and the like. Of course it is to be understood that each R radical may be the same or different in any given siloxy unit. Moreover, it should also be understood that mixtures of the same or different linear fluid organopolysiloxanes may be employed in the curable compositions of this invention. The preferred siloxanes are the dimethylsiloxane linear fluids.

The above-mentioned linear fluid organopolysiloxanes, as well as their method of manufacture, are well known in the art and generally have a viscosity of from 500 to 50,000 centipoises when measured at 25° C. Such types of siloxane polymers and methods for preparing same may be found more fully described in U.S. Patent Nos. 2,607,792 and 2,843,555, the teachings of which are incorporated herein by reference thereto.

The particular catalytic curing agents used in the practice of this invention is also not narrowly critical. Any suitable conventional room temperature vulcanizable catalyst may be employed. Among the more preferred catalytic agents are the metallic salts of an organic carboxylic acid in which the metallic ion is selected from the class consisting of lead, tin, zirconium, antimony, iron, cadmium, barium, calcium, titanium, bismuth and manganese. Examples of such acid radicals are those carboxylic acids containing from 1 to 20 carbon atoms, such as those yielding the acetate, butyrate, octoate, laurate, resinate, linoleate, stearate, oleate, naphthenate acid radicals and the like. Illustrative examples of such salts include, for instance, tin naphthenate, lead octoate, tin octoate, iron stearate, tin oleate, antimony octoate, tin butyrate, stannous octoate, zirconium octoate, cadmium octoate, barium octoate, calcium octoate, titanium naphthenate, bismuth naphthenate, manganese octoate, plumbous octoate, plumbic tetraoctoate, dibutyltindilaurate and the like. Generally it is preferred to employ salts which are soluble in the organopolysiloxane fluids containing terminal silicon-bonded hydroxyl groups, like the lead and tin salts, especially dibutyltindilaurate. Of course only a catalytic amount of curing agent need be employed but higher amounts may be used if desired. Generally it is sufficient for most purposes if the metallic salt is present in an amount ranging from 0.1 to 5 percent by weight of the weight of organopolysiloxane linear fluid employed. Moreover, it is obvious that if one wishes, mixtures of such catalysts may also be used.

The epoxy silicon compounds used as the cross-linking agent in the practice of this invention are those selected from the group consisting of epoxy silanes of the formula

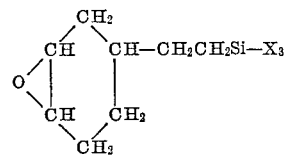

and epoxy silanes of the formula

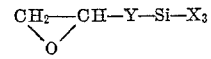

wherein each X is individually an alkoxy radical, such as methoxy, ethoxy, propoxy, isopropoxy, butoxy, beta-methoxyethoxy and the like, and wherein Y is a divalent bridging group selected from the class consisting of divalent hydrocarbon radicals having from 1 to 18 carbon atoms and divalent oxyhydrocarbon radicals having from 1 to 18 carbon atoms wherein the oxygen atom is present in the form of an ether linkage. Illustrative examples of such epoxy compounds are for instance β-(3,4-epoxycyclohexyl)ethyltrimethoxysilane;
3,4-epoxybutyltrimethoxysilane;
4,5-epoxypentyltrimethoxysilane;

6,7-epoxyheptyltrimethoxysilane;
γ-glycidoxypropyltrimethoxysilane;
γ-glycidoxypropyltriethoxysilane;
γ-glycidoxypropyltripropoxysilane;
γ-glycidoxypropyltriisopropoxysilane;
γ-glycidoxypropyltribetamethoxyethoxysilane;
γ-glycidoxyethyltrimethoxysilane and the like. The preferred epoxy silanes are β-(3,4-epoxycyclohexyl)ethyltrialkoxysilane and γ - glycidoxypropyltrialkoxysilane, especially β-(3,4-epoxycyclohexyl)ethyltrimethoxysilane and γ - glycidoxypropyltrimethoxysilane. Such epoxy silanes as well as their method of manufacture are well known in the art. The amount of epoxy silane present in the instant compositions may range from 0.1 to 10 percent by weight or more based on the weight of the organopolysiloxane linear fluid employed. Generally it is preferred to employ amounts by weight of epoxy silane ranging from 0.5 to 5 percent based on the weight of the organopolysiloxane linear fluid used. Of course it should be understood that if desired mixtures of such epoxysilanes may also be employed.

While not necessary, various fillers may be incorporated in the mixture of ingredients and are generally used to provide body and strength to the elastomeric product. Any finely divided particulate filler or suitable combination of such fillers may be employed by the instant invention in accordance with heretofore customary procedures in the silicon elastomer art. Among such conventional fillers are, for example, titanium dioxide, lithopone, zinc oxide, zirconium silicate, silica aerogel, iron oxide, diatomaceous earths, clay, calcium carbonate, ground quartz, fume silica, precipitated silica, glass fibers and the like. While the amount of filler may vary from about 10 to 300 parts by weight per 100 parts by weight of the organopolysiloxane linear fluid employed generally about 30 to 80 parts by weight of filler is used. Of course the exact amount of filler used will depend upon such factors as, the application with which the elastomer is intended, the type of filler employed, the type of convertible organopolysiloxane fluid used, and the like.

In order to prepare the room temperature vulcanizable compositions herein described, it is only necessary to mix the ingredients, preferably adding the metallic salt catalyst and epoxysilane last, since shortly after incorporation of these last ingredients in the linear fluid organopolysiloxane containing terminal silicon-bonded hydroxyl groups room temperature curing, for instance at temperatures ranging from about 20° C. to 40° C. will take place. In a matter of a few minutes a tight cure will begin to be noticed, and with a few hours the ultimate cure at room temperature will be attained resulting in a cross-linked elastomer.

It should also be understood that other additives which do not affect the performance and essential purpose of the instant invention may also be present in the room temperature vulcanizable composition. For instance, pigments or dyestuffs may be present to give color to the ultimate elastomer and improve its aesthetic appearance, as well as, plasticizers, softeners, ordorants, thermal stabilizers, anti-oxidants and the like.

The elastomeric products of the room temperature vulcanizable siloxane compositions of this invention have a wide range of utility such as an encapsulation material for electrical components, as gasket materials, as shock absorbers, and for other conventional applications for which known natural synthetic rubbers are not suitable. Moreover, the elastomers of this invention are especially useful for purposes wherein it is desired to have the elastomer adhere to primed metallic surfaces since the presently claimed elastomers are especially tenacious and adhesive to such metallic surfaces, particularly primed steel.

The following examples are illustrative of the present invention and are not to be regarded as limitative. It is to be understood that all parts, percentages and proportions referred to herein and in the appended claims are by weight unless otherwise indicated.

EXAMPLE I

A cross-linked siloxane elastomer was prepared by forming a composition comprising 100 parts by weight of a dimethylsiloxane polymer fluid containing terminal silicon-bonded hydroxyl groups [HO(CH₃SiCH₃O)H] and having a viscosity of about 8000 centipoises at 25° C., 2 parts by weight of γ-glycidoxypropyltrimethoxysilane,

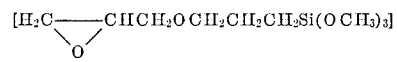

and 0.5 parts by weight of dibutyltindilaurate catalyst and allowing said composition to stand at room temperature until ultimately cured into a solid elastomeric product.

Similar room temperature cured siloxane elastomers may be prepared by replacing the above epoxysilane with other cross-linking agents, such as β-(3,4-epoxycyclohexyl)ethyltrimethoxysilane,
3,4-epoxybutyltrimethoxysilane,
4,5-epoxypentyltrimethoxysilane,
6,7-epoxyheptyltrimethoxysilane,
γ-glycidoxypropyltriethoxysilane,
γ-glycidoxypropyltripropoxysilane,
γ-glycidoxypropyltriisopropoxysilane,
γ-glycidoxypropyltribetamethoxyethoxysilane and γ-glycidoxyethyltrimethoxysilane and/or by replacing the above catalyst with other metallic salts, such as tin naphthenate, lead octoate, tin octoate, iron stearate, tin oleate, antimony octoate, tin butyrate, stannous octoate, zirconium octoate, cadmium octoate, barium octoate, calcium octoate, titanium naphthenate, bismuth naphthenate, manganese octoate, plumbous octoate and plumbic tetraoctoate.

EXAMPLE II

A cross-linked siloxane elastomer similar to that of Example I was prepared, but having more body and reinforcement, by incorporating into the vulcanizable composition of Example I, about 60 parts by weight of a finely divided silicate filler.

EXAMPLE III

A room temperature vulcanizable composition comprising 100 parts by weight of dimethylsiloxane polymer fluid containing terminal silicon-bonded hydroxyl groups and having a viscosity of 8000 centipoises at 25° C., 60 parts by weight of γ-glycidoxypropyltriethoxysilane and 0.5 parts by weight of dibutyltindilaureate was prepared. A primed steel panel was prepared by thoroughly cleaning the steel and treating it with Chemlock 607, air drying and curing for fifteen minutes at 300° F. as disclosed in U.S. Patent 3,022,196. Said composition was then cured at room temperature in contact with the primed steel panel and the elastomer producted exhibited excellent tight bonding to the primed steel.

As a comparative experiment the same procedure was repeated except that 2 parts of commercial Ethylsilicate 40 was used as the cross-linker in the room temperature vulcanizable composition instead of the γ-glycidoxypropyltriethoxysilane. The elastomer product free from epoxysilane exhibited no bonding to the primed steel.

EXAMPLE IV

A room temperature vulcanizable composition comprising 100 parts by weight of dimethylsiloxane polymer fluid containing terminal silicon-bonded hydroxyl groups and having a viscosity of 8000 centipoises at 25° C., 42 parts by weight of ground quartz, 18 parts by weight of silicate, 2 parts by weight of beta-(3,4-epoxycyclohexyl)ethyltrimethoxysilane and 0.5 parts by weight of dibutyltindilaurate was prepared and cured at room temperature in contact with a primed steel panel as prepared in Example III. The elastomeric product exhibited excellent tight bonding to the primed steel.

Various modifications and variations of this invention will be obvious to a worker skilled in the art and it is understood that such modifications and variations are to be included within the purview of this application and the spirit and scope of the appended claims.

What is claimed is:

1. A room temperature vulcanizable composition comprising (1) a linear, fluid diorganopolysiloxane containing terminal silicon-bonded hydroxyl groups and having a viscosity of from 500 to 50,000 centipoises at 25° C. and wherein the organo groups are monovalent hydrocarbon radicals and (2) an epoxysilane selected from the class consisting of epoxysilanes of the formula

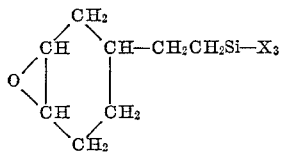

and epoxysilanes of the formula

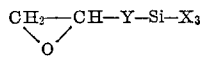

wherein each X is individually an alkoxy radical and wherein Y is a divalent bridging group selected from the class consisting of divalent hydrocarbon radicals having from 1 to 18 carbon atoms and divalent oxyhydrocarbon radicals having from 1 to 18 carbon atoms wherein the oxygen atom is present in the form of an ether linkage.

2. A room temperature vulcanizable composition as defined in claim 1 containing as an additional ingredient a finely divided filler.

3. A room temperature vulcanizable composition as defined in claim 1, wherein the organopolysiloxane is a dimethylpolysiloxane linear fluid and wherein the epoxy silane is a beta-(3,4-epoxycyclohexyl)ethyltrialkoxysilane.

4. A room temperature vulcanizable composition, as defined in claim 1, wherein the organopolysiloxane is a dimethylpolysiloxane linear fluid and wherein the epoxy silane is a γ-glycidoxypropyltrialkoxysilane.

5. A room temperature vulcanizable composition, as defined in claim 3 wherein the epoxysilane is beta-(3,4-epoxycyclohexyl)ethyltrimethoxysilane.

6. A room temperature vulcanizable composition as defined in claim 4 wherein the epoxysilane is selected from the class consisting of γ-glycidoxypropyltrimethoxysilane and γ-glycidoxypropyltriethoxysilane.

7. A cross-linked elastomer obtained from a room temperature vulcanizable composition comprising (1) a linear, fluid diorganopolysiloxane containing terminal silicon-bonded hydroxyl groups and having a viscosity of from 500 to 50,000 centipoises at 25° C., and wherein the organo groups are monovalent hydrocarbon radicals, (2) an epoxysilane selected from the class consisting of epoxysilanes of the formula

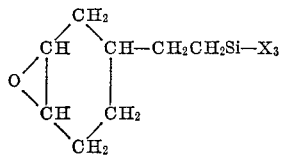

and epoxysilane of the formula

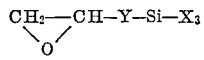

wherein each X is individually an alkoxy radical and wherein Y is a divalent bridging group selected from the class consisting of divalent hydrocarbon radicals having from 1 to 18 carbon atoms and divalent oxyhydrocarbon radicals having from 1 to 18 carbon atoms wherein the oxygen atom is present in the form of an ether linkage and (3) a metallic salt of an organic carboxylic acid in which the metal ion is selected from the class consisting of lead, tin, zirconium, antimony, iron, cadmium, barium, calcium, titanium, bismuth and manganese.

8. A cross-linked elastomer as defined in claim 7, wherein the room temperature vulcanizable composition contains a filler as an additional ingredient.

9. A cross-linked elastomer as defined in claim 8 wherein the organopolysiloxane is a dimethylpolysilane fluid, wherein the epoxysilane is a beta-(3,4-epoxycyclohexyl) ethyltrialkoxysilane and the metallic salt is dibutyltindilaurate.

10. A cross-linked elastomer as defined in claim 9 wherein the epoxysilane is beta-(3,4-epoxycyclohexyl) ethyltrimethoxysilane.

11. A cross-linked elastomer as defined in claim 8 wherein the organopolysiloxane is a dimethylpolysiloxane fluid, wherein the epoxysilane is a γ-glycidoxypropyltrialkoxysilane and the metallic salt is dibutyltindilaurate.

12. A cross-linked elastomer as defined in claim 11, wherein the epoxysilane is selected from the class consisting of γ-glycidoxypropyltrimethoxysilane and γ-glycidoxypropyltriethoxysilane.

References Cited

UNITED STATES PATENTS

| | | | |
|---|---|---|---|
| 3,127,363 | 3/1964 | Nitzsche et al. | 260—18 |
| 3,161,614 | 12/1964 | Brown et al. | 260—46.5 |
| 3,205,197 | 9/1965 | Cohen et al. | 260—46.5 |
| 2,843,555 | 7/1958 | Berridge | 260—18 |

FOREIGN PATENTS

| | | |
|---|---|---|
| 739,489 | 7/1966 | Canada. |

DONALD E. CZAJA, Primary Examiner

M. I. MARQUIS, Assistant Examiner

U.S. Cl. X.R.

117—135.1; 260—37, 46.5, 348

PO-1050
(5/69)

UNITED STATES PATENT OFFICE
CERTIFICATE OF CORRECTION

Patent No. 3,485,780.  Dated December 23, 1969

Inventor(s) Samuel Sterman et al.

It is certified that error appears in the above-identified patent and that said Letters Patent are hereby corrected as shown below:

In column 2, line 16 the term "agents" should be --agent--. In column 4, line 7 the formula "$[HO-(CH_3SiCH_3O)-H]$" should be --$[HO-(CH_3SiCH_3O)_x-H]$--. In column 4, line 51 after the phrase "by weight of" the phrase --a finely divided silicate filler; 2 parts by weight of-- should be added. In column 4, line 59 the term "producted" should be --product--.

SIGNED AND
SEALED
SEP 22 1970

(SEAL)
Attest:

Edward M. Fletcher, Jr.
Attesting Officer

WILLIAM E. SCHUYLER, JR
Commissioner of Patents